May 30, 1961 — W. H. HOGAN — 2,986,165
BALANCED SLIDE VALVE
Filed Jan. 23, 1956

INVENTOR.
WALTER H. HOGAN
BY
ATTORNEY

United States Patent Office 2,986,165
Patented May 30, 1961

2,986,165
BALANCED SLIDE VALVE

Walter H. Hogan, Olmsted Falls, Ohio, assignor to Cleveland Pneumatic Industries, Inc., Cleveland, Ohio, a corporation of Ohio Filed Jan. 23, 1956, Ser. No. 560,640

1 Claim. (Cl. 137—622)

This invention relates to valve mechanisms and more particularly to a valve structure wherein the valve slide is free to float within the valve chamber.

It is an important object of this invention to provide a valve structure wherein the valve slide is free to float within the valve chamber so that the elements will automatically align themselves thereby eliminating any bending, binding or the like.

It is another object of this invention to provide a valve structure which is easily manufactured to very close tolerances so that a superior low cost product results.

Further objects and advantages will appear from the following description and drawings, wherein.

Control valves for fluid cylinders and other types of fluid motors normally must provide for the reversal of the fluid connections to the fluid motor as well as an off position. Spool valves and the like have been used in the past for this purpose, however, the manufacture of spool valves is difficult and expensive since the spool must be lapped inside the cylinder to provide accurate sealing surfaces. A valve according to this invention permits the rework of the elements at any time during the manufacture or after the valve is in use. Also, the slide mechanism is arranged so that it is free floating within the valve chamber so that there will be no eccentric or misalignment loads which would cause binding or sticking.

Figure 1:
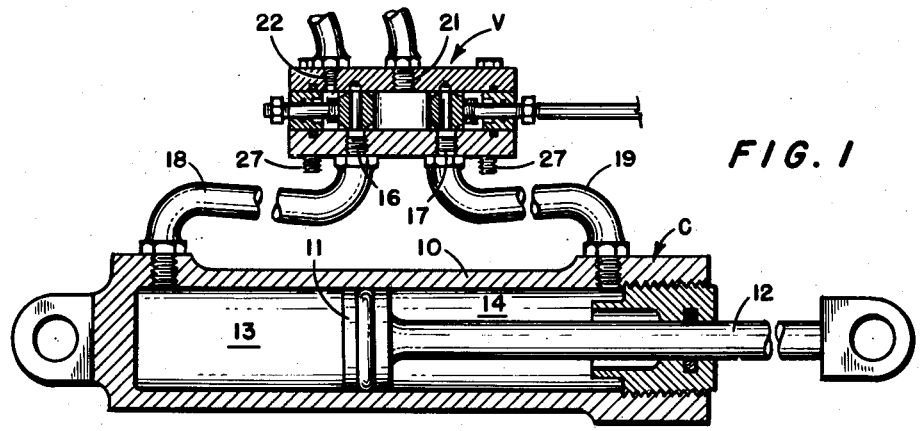
Figure 1 is a side elevation in longitudinal section showing a valve according to this invention connected to a standard fluid cylinder as an illustration of one of the many applications of the valve's use.

Referring to Figure 1, a valve "V" is shown as it would be used in conjunction with a normal fluid cylinder "C." It should be understood that this control valve could be used to control the fluid flow to and from many types of mechanisms and that the fluid cylinder "C" shown in Figure 1 is just representative of one of the many uses of the valve. In this case, the cylinder "C" is provided with a cylinder member 10, a cooperating piston 11 and piston rod 12. The piston divides the fluid cavity within the cylinder 10 into a first chamber 13 and a second chamber 14 so that pressure fluid introduced into the chamber 13 produces a force reaction on the piston 11 to the right if the chamber 14 is connected to the reservoir return. Conversely if pressure fluid is introduced into the chamber 14 and the chamber 13 is connected to the reservoir return, a force reaction results on the piston 11 which urges it to the left.

The valve "V" is provided with two controlled ports 16 and 17 which are connected to the chambers 13 and 14 respectively through pressure lines 18 and 19 respectively. A source of pressure fluid is connected to an inlet port 21 and a reservoir return to an outlet port 22. The valve can be operated so that the inlet port 21 and outlet port 22 are isolated from the cylinder "C" or selectively operated so that either one of the controlled ports 16 and 17 is connected to the inlet port 21 and at the same time the other of the controlled ports is connected to the reservoir outlet port 22.

Figure 2:
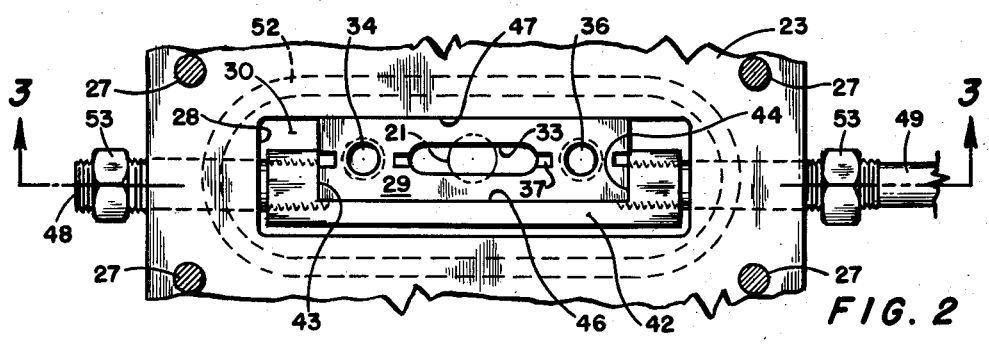
Figure 2 is a plan view with the upper plate removed showing the structural details of the valve.
Figure 3:
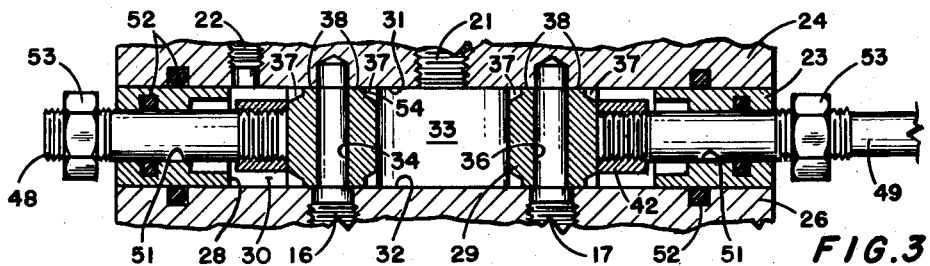
Figure 3 is a cross section taken along 3—3 of Figure 2 showing the valve in the closed or off position; and, Figure 4 is a view similar to Figure 3 showing the position the elements assume in one of the open positions.
Figure 4:
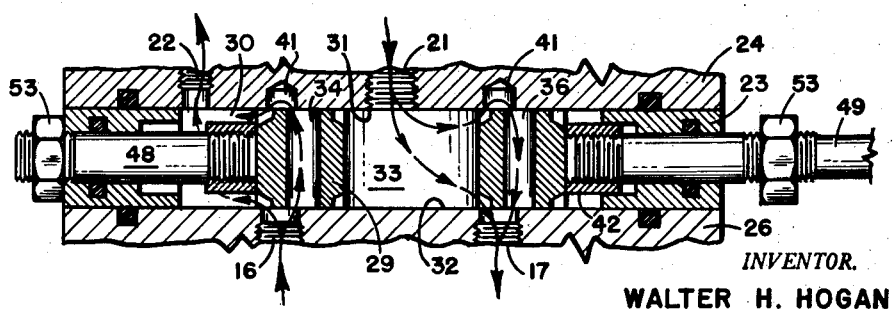

Reference should now be made to Figures 2 through 4 for a detailed description of the valve structure per se. The valve is provided with a spacer 23 positioned between opposed side plates 24 and 26. The spacer 23 is formed with a rectangular opening 28 which is closed on opposite sides by the side plates 24 and 26 so that the three members cooperate to define a valve cavity 30. The controlled ports 16 and 17 extend through the side plate 26 and the inlet and outlet ports 21 and 22 extend through the side plate 24 with all of the ports opening into the valve cavity 30. A valve slide 29 is positioned within the valve chamber or cavity 30 for axial motion therein. The two side plates 24 and 26 provide flat parallel opposed surfaces 31 and 32 respectively against which the sides of the valve slide 29 fit. The valve slide is formed with a central slot 33 which is open to the inlet port 21 so that pressure fluid is always present therein and two cross bores 34 and 36 which are axially aligned with the controlled ports 16 and 17 respectively when the valve is in the off position shown in Figure 3. On either side of each of the cross bores 34 and 36 the valve slide 29 is formed with notches 37 which are separated from the cross bores by short lands 38. The lands 38 provide a fluid seal with the opposed surfaces 31 and 32 immediately adjacent to the controlled ports 16 and 17 so that these ports are isolated from both the inlet port 21 and outlet port 22 when the valve slide is in the off or neutral position shown in Figure 3. If, however, the valve slide is moved to the right to the position shown in Figure 4, the lands 38 move into the opening of the control ports so that the notches 37 are in communication with the corresponding controlled ports. At this time the controlled port 17 is brought into fluid communication with the inlet port 21 and the controlled port 16 is in communication with the outlet port 22 as indicated by the arrows in Figure 4. The side plate 24 is preferably formed with blind recesses 41 axially aligned with the controlled ports 16 and 17 so that fluid may flow through the cross bores 34 and 36 around the upper lands 38 and through the upper notches 37 to balance and increase the flow capacity of the valve. If the valve slide is moved from the position shown in Figure 3 to the left, the opposite connection is made and the inlet port 21 is connected to the controlled port 16 and the outlet port 22 is connected to the controlled port 17. Therefore, movement of the valve slide 29 from the neutral position of Figure 3 connects the controlled ports selectively to either the inlet port 21 or outlet port 22.

In order to operate the valve slide 29, I prefer to provide an operating yoke 42 positioned within the valve cavity 30 which is provided with opposed parallel surfaces 43 and 44 perpendicular to the line of action of the valve slide 29 which engage opposite ends of the valve slide so that axial motion of the yoke causes the valve slide to move therewith while leaving the valve slide unrestrained in a plane normal to the opposed surfaces 31 and 32 so that the valve slide is permitted to align itself laterally between the opposed surfaces 31 and 32. The yoke 42 also provides a side surface 46 which cooperates with a side wall 47 formed on the spacer 23 to provide lateral guiding in the horizontal plane. The yoke member 42 is carried by two rods 48 and 49 which extend through aligned bores 51 formed in the spacer 23 which are threaded into opposite ends of the yoke 42. Suitable fluid seals 52, preferably of the O-ring type, seal the joints between the spacer 23 and the side plates 24 and 26 as well as prevent leakage along the rods 48 and 49. Adjustable stop nuts 53 are threaded onto the rods 48 and 49 to limit the extent of axial motion of the rods and in turn the valve slide 29.

Because of the structural relationship between the valve elements described above, a valve according to this invention may be easily manufactured without the necessity of special equipment. The two side plates 24 and 26 are ground on a surface grinder to provide the flat surfaces 31 and 32. Preferably the valve slide is formed by grinding it with the spacer member 23 so that they have the same thickness. The exact thickness is not critical so long as the opposite surfaces of the spacer element 23 and of the valve 29 are equally spaced and parallel. After the valve slide is ground on a surface grinder with the spacer member, the valve slide itself is lapped to improve the sealing surface and also to provide the very small amount of clearance necessary to permit it to move axially within the valve chamber 30. The principal reason for utilizing the yoke is to eliminate the necessity of accurate alignment between the bores 51 with corresponding fastening means on the valve slide per se. Those skilled in the art will recognize that the slightest amount of side force on the valve slide 29 will hold the valve slide against one of the surfaces 31 and 32 and that this produces an unbalanced pressure which causes sticking or jamming of the valve. By utilizing the yoke connection the valve slide 29 is unconfined in a direction normal to the surfaces 31 and 32 so that it is free to float and properly orient itself in the valve chamber at all times. Thus the alignment of the bores 51 with any particular point on the valve slide 29 is not critical.

The notches 37 should be initially formed with a wall portion 54 normal to the surfaces 31 and 32 to provide stock for the grinding and lapping so that the notch shape will not be changed during these operations. Those skilled in the art will recognize that by utilizing this structure a valve may be easily reconditioned with a surface grinder. If wear has occurred in the use of the valve, it is merely necessary to regrind the valve slide 29 with the spacer member 23, relap the valve slide 29 and reassemble. If this is done the valve will be returned to its initial operating condition. This is possible because the lateral width of the spacer member 23 and the valve slide is not critical so long as the width relationship of the two members remains the same. Here again the floating feature makes this possible.

Because the high pressure fluid is only contained within the central slot 33 and that low pressure fluid surrounds the valve slide, the seals 52 are not subject to high pressure and leakage is minimized. Any leakage from the central slot 33 merely flows to the valve cavity around the valve slide which is connected to the outlet port 22.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description are determinative of the scope of the invention.

I claim:

A valve comprising a body assembly including a spacer sleeve member positioned between opposed surface members cooperating to define a cavity having opposed parallel surfaces, said assembly being formed with a pair of spaced control ports in communication with said cavity through one of said surfaces, a blind bore having an area and cross section identical to said control ports formed in the other of said surfaces directly opposite each of said control ports, a slide element in said cavity movable in opposite directions between a neutral position and spaced operated positions, said slide being formed with cross bores communicating with each of said control ports and their associated blind bores in all positions of said slide, said slide being formed with end walls spaced from said control ports and blind bores in all positions of said slide, a pressure port in communication with said cavity through one of said surfaces, a central elongated slot through said slide having ends spaced from said control ports and blind bores in all positions of said slide and said slot being aligned with and connected to the pressure port in all positions of the slide, first notches formed in said slide communicating with said central slot for pressure flow from the central slot through the first notches and having portions normal to said surfaces, and second notches formed in said slide communicating with said end walls for flow through said second notches to said end walls and having portions normal to said surfaces, all of said notches being spaced from said control ports and blind bores when said slide is in neutral position to prevent flow through said valve, and movement of said slide to an operated position selectively moving some of said first notches into communication with one of said control ports and its associated blind bore for flow from said central slot through the first notches, the blind bore and the cross bore to said one control port and moving some of said second notches into communication with the other of said control ports and its associated blind bore for flow from said other control port through the cross bore, the blind bore and the second notches to an end wall of the slide, said first notches providing the only direct communication from the central slot to a control port and a blind bore and said second notches providing the only direct communication from a control port and a blind bore to an end wall of the side when said slide is in an operated position.

References Cited in the file of this patent

UNITED STATES PATENTS

| 384,883 | Williams | June 19, 1888 |
| 473,744 | Harrison | Apr. 26, 1892 |
| 771,132 | Edwards | Apr. 23, 1904 |
| 932,955 | Brunton | Aug. 31, 1909 |
| 1,163,452 | Quigley | Dec. 7, 1915 |
| 2,743,900 | Holzer et al. | May 1, 1956 |
| 2,745,433 | Schneider et al. | May 15, 1956 |